United States Patent
Suzuki et al.

(10) Patent No.: US 6,806,434 B1
(45) Date of Patent: Oct. 19, 2004

(54) ELECTRIC DISCHARGE MACHINE WITH OUTPUT POWER CONTROL

(75) Inventors: Akihiro Suzuki, Tokyo (JP); Akihiko Iwata, Tokyo (JP); Takashi Hashimoto, Tokyo (JP); Yoshikazu Tsunoda, Tokyo (JP); Hideaki Hayashi, Tokyo (JP); Atsushi Taneda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/296,329
(22) PCT Filed: May 26, 2000
(86) PCT No.: PCT/JP00/03406
§ 371 (c)(1), (2), (4) Date: Nov. 22, 2002
(87) PCT Pub. No.: WO01/89749
PCT Pub. Date: Nov. 29, 2001

(51) Int. Cl.[7] ................................................. B23H 1/02
(52) U.S. Cl. ................................................. 219/69.13
(58) Field of Search ........................... 219/69.13, 69.18, 219/130.33

(56) References Cited
U.S. PATENT DOCUMENTS 4,673,791 A * 6/1987 Konno et al. ............. 219/69.17
5,149,931 A * 9/1992 Magara ..................... 219/69.13
6,498,321 B1 * 12/2002 Fulmer et al. .......... 219/130.33
6,710,279 B1 * 3/2004 Higashi ..................... 219/69.13

FOREIGN PATENT DOCUMENTS

JP 6-8049 1/1994
WO WO99/56905 * 11/1999

* cited by examiner

Primary Examiner—Geoffrey S. Evans
(74) Attorney, Agent, or Firm—Sughrue Mion, PLLC

(57) ABSTRACT

An electric discharge machine in which electric power for working is supplied between an electrode and workpiece by an electric power unit so as to generate electric discharge between the electrode and workpiece and conduct machining on the workpiece, the electric discharge machine having a voltage detector for detecting output voltage V of a DC electric power source of the electric power unit; a current detector for detecting output current I of the DC electric power source of the electric power unit; a calculator for calculating product V·I of V and I; and a controller for controlling output electric power of the electric power unit to be constant on the basis of a difference between a working command signal for giving a predetermined electric power command and V·I. Even when load impedance fluctuates, it is possible to suppress the fluctuation of electric discharge power, so that surface roughness on a machined face of the workpiece can be made uniform.

9 Claims, 15 Drawing Sheets

FIG. 19 (a) PRIOR ART
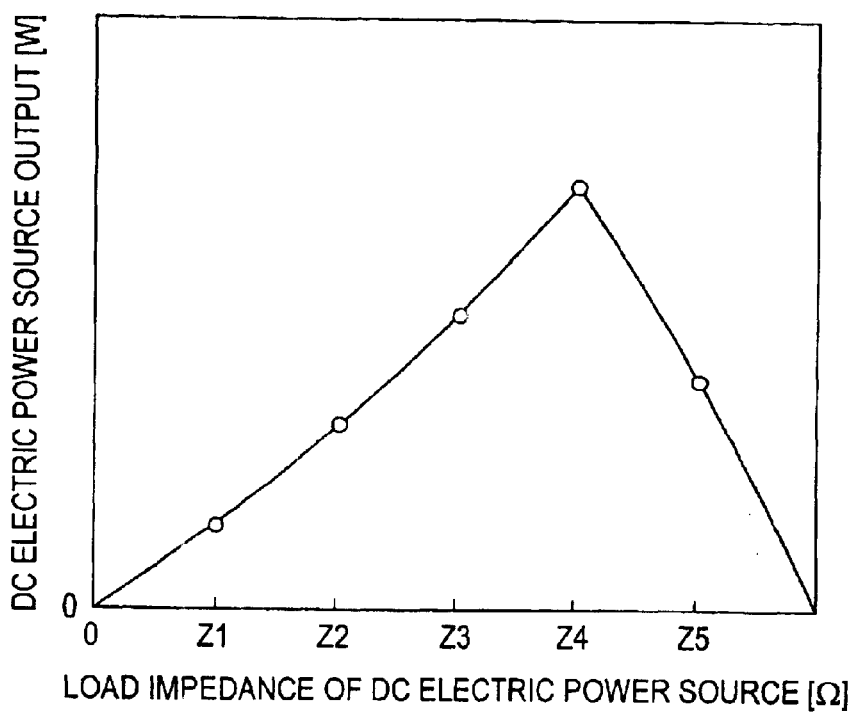
FIG. 19 (b) PRIOR ART
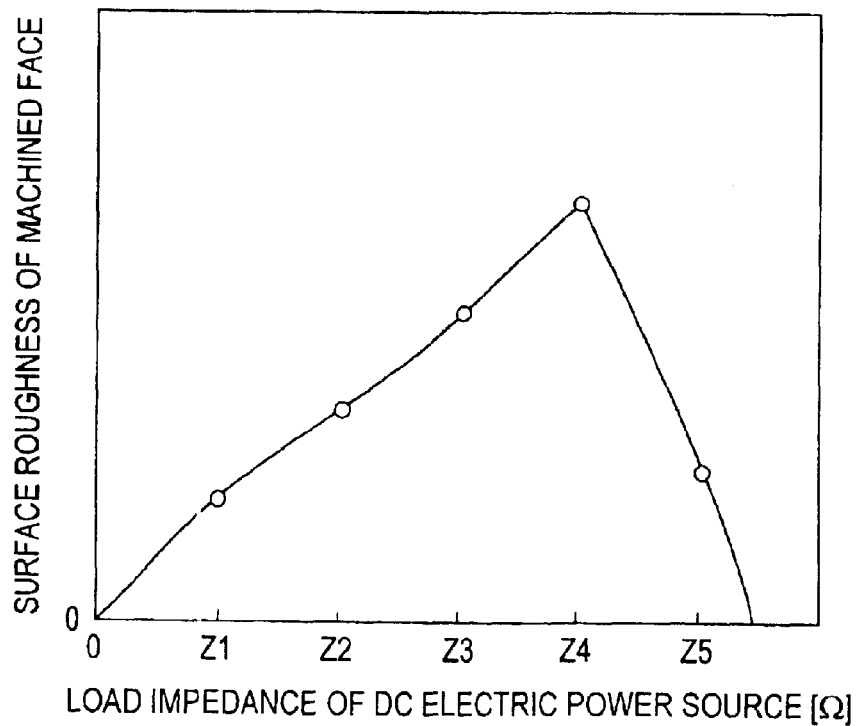

ELECTRIC DISCHARGE MACHINE WITH OUTPUT POWER CONTROL

TECHNICAL FIELD

The present invention relates to improvements in an electric discharge machine to machine a workpiece when electric discharge is generated between an electrode and the workpiece.

BACKGROUND ART

In an electric discharge machine, electric power is supplied to between an electrode and a workpiece so as to generate electric discharge between these poles, and electric discharge machining is conducted while the electrode and workpiece are relatively moving from each other. FIG. 14 is a schematic illustration showing a constitution of a wire electric discharge machine which is an example of the conventional electric discharge machine. In FIG. 14, reference numeral 1 is a wire electrode composed of a wire of copper or brass, the diameter of which is approximately 0.03 mm to 0.3 mm, reference numeral 2 is a workpiece, reference numeral 3 is an electric power unit, reference numerals 4a and 4b are feeder lines, reference numeral 5 is a feeder piece, reference numeral 6 is a feed reel, reference numeral 7 is a brake roller, reference numeral 8 is a winding roller, reference numeral 9 is a winding reel, reference numeral 10 is an XY table, reference numerals 11 and 12 are an X-axis motor and Y-axis motor to drive the XY table 10, reference numerals 13a and 13b are motor control lines, reference numeral 14 is a control unit, reference numeral 15 is a servo circuit, reference numeral 16 is a working solution, reference numeral 17 is a working solution tank, reference numeral 18 is a pump, reference numerals 19a and 19b are working solution supply pipes, and reference numeral 20 is a wire guide.

Next, operation will be explained as follows. A working solution 16 is supplied between the wire electrode 1 and the workpiece 2 from the pump 18 via the working solution supply pipes 19a and 19b. Voltage is impressed between these poles by the electric power unit 3 via the feeder lines 4a and 4b and the feeder piece 5. When an electric potential difference between the poles exceeds the electric discharge starting voltage, electric discharge is generated, and the workpiece 2 is machined by this electric discharge.

The workpiece 2 is fixed onto the XY table 10. When the X-axis motor 11 and Y-axis motor 12 to drive the XY table 10 are driven being controlled, the wire electrode 1 and the workpiece 2 are relatively moved from each other, so that the workpiece 2 can be machined to a predetermined profile.

FIG. 15 is an arrangement view showing an equivalent circuit of the electric power unit and load section in the case of machining a workpiece at high speed by a conventional electric discharge machine. In the view, reference numeral 3a is an electric power unit used for rough machining, reference numerals 4a and 4b are feeder lines, reference numeral 21 is a load section which is shown as an equivalent circuit between the wire electrode 1 and workpiece 2, reference numeral 22 is inductance, reference numeral 23 is capacitance, reference numeral 24 is a switch, and reference numeral 25 is electric discharge resistance.

Next, operation will be explained below. In FIG. 15, the start of electric discharge is represented by the switch 24 in the equivalent circuit. When voltage is not impressed upon the circuit by the electric power unit 3a used for rough machining, the switch 24 is turned off. When voltage is impressed by the electric power unit 3a used for rough machining, voltage at both ends of the capacitance 23 is raised. When the voltage at both ends of the capacitance 23 is raised to an electric discharge starting voltage, an electric conductive path is formed between the poles and electric discharge is generated. Simultaneously when electric discharge is started, the switch 24 in the equivalent circuit is turned on, and an electric current flows in the electric discharge resistance 25. By the heat generated from this electric discharge resistance 25, temperature of the workpiece 2 is locally raised, and machining starts and proceeds so that a portion of material can be removed from the workpiece 2.

The electric power unit 3a used for rough machining is a DC electric power source and directly lets a pulse electric current flow between the poles via a resistance and transistor. Output control of the electric power unit 3a is conducted when ON time of the transistor is set. This electric power unit 3a used for rough machining can output electric current pulses of various intensities of energy.

As described above, the electric power unit 3a used for rough machining reduces the frequency to several tens kHz and lets a high peak electric current flow. Therefore, the workpiece 2 can be machined at high speed. However, since machining is conducted by electric pulses of various intensities of energy, a machined surface becomes rough and irregular. Therefore, the electric power unit 3a used for rough machining is not appropriate for highly accurate machining such as finishing of the workpiece 2.

FIG. 16 is an arrangement view showing an equivalent circuit of an electric power source and load section in the case of highly accurately machining a workpiece by a conventional electric discharge machine. For example, this arrangement is the same as that of the JP-A-6-8049. In this case, like reference characters are used to indicate like reference parts in FIGS. 15 and 16. In FIG. 16, reference numeral 3b is a high frequency electric power source, the frequency of which is, for example, not less than 1 MHz, reference numeral 26 is a DC electric power source, reference numeral 27 is an oscillator, reference numeral 28 is an amplifier, and reference numeral 29 is a matching circuit. Electric power of high frequency is supplied from the high frequency electric power unit 3b to between the poles and made to come and off at high speed. At the same time, while electric discharge energy is being restricted by adjusting impedance with the matching circuit 29, electric discharge is easily conducted, so that a fine portion of material of the workpiece can be removed by electric discharge.

As shown in FIG. 16, the high frequency electric power unit 3b includes a DC electric power unit 26, oscillator 27 and amplifier 28. The DC electric power unit 26 supplies electric power necessary for operating the oscillator 27 and amplifier 28. The oscillator 27 provides an oscillating output by a resonance circuit in which reactance elements are respectively connected between base emitters, base collectors and collector emitters of a transistor. In order to stabilize the oscillating frequency, a quartz oscillator is used in a portion of the reactance element in many cases. The amplifier 28 amplifies an electric power output of the oscillator 27. For example, in the case of a transformer connecting type amplifier, transformers are respectively inserted between the base and emitter and also between the collector and emitter of the transistor used for amplification. DC electric power unit is connected between the collector and emitter of the transistor used for amplification, and an output, the electric power of which has been amplified, is taken out via the transformer.

DC electric power source 26 composing the high frequency electric power unit 3b is usually controlled so that voltage can be kept constant. FIG. 17 is a schematic illustration showing an operation region of the output current and output voltage of DC electric power source 26. In order to prevent the occurrence of damage caused by over-voltage and over-current, DC electric power source 26 is provided with the maximum value Vmax and Imax to restrict the output voltage and output current. Accordingly, the operation region is a hatched portion of the graph shown in FIG. 17 surrounded by points C, D, F and E.

In order to determine the operation point, it is necessary to set an output voltage. For example, when the output voltage is set at Vo, in order to conduct an output voltage constant control operation, DC electric power source 26 operates so that the output voltage can be kept at Vo at all times. The output current is determined by load impedance with respect to DC electric power unit 26. Therefore, the output operation point of DC electric power unit 26 moves on a straight line connecting point A with point B in FIG. 17 due to load impedance.

As described above, in the case where DC electric power source of the output voltage constant control system is used for DC electric power source 26 composing the high frequency electric power unit 3b, the discharge electric power greatly changes especially when load impedance greatly changes.

FIG. 18 is a schematic illustration showing an operation point of DC electric power source in the case where load impedance with respect to DC electric power source is changed. In FIG. 16, straight lines Z1, Z2, Z3, Z4 and Z5 are load characteristic lines in the case where load impedance Z is respectively Z1, Z2, Z3, Z4 and Z5. For example, operation points in the case where output voltage is set at Vo are P1, P2, P3 and P4 which are points of intersection of the straight line, which connects point A with point B, with the load characteristic lines Z1, Z2, Z3 and Z4. An operation point moves onto over-current protecting line DF in the case where the load characteristic line is 25, that is, an operation point is P5 in the case where the load characteristic line is Z5. In this case, operation points P1, P2, P3 and P4 are located on the characteristic lines, the output voltage of which is constant. Therefore, the output voltage of DC electric power source is kept constant, however, the output electric power of each operation point changes.

FIG. 19 is a view showing an output of DC electric power source with respect to load impedance and also showing surface roughness of a machined face of a workpiece. As shown in FIG. 18, output electric currents at operation points P1, P2, P3 and P4 are increased in this order. Therefore, output electric power of DC electric power source is increased at each operation point in this order. Since operation point P5 enters the over-current protecting region, output voltage is decreased and output electric power is also decreased as shown in FIG. 19(a).

Since surface roughness of the machined face relates to electric discharge power generated between the poles, surface roughness of the machined face changes by the intensity of output electric power of DC electric power source. Accordingly, when load impedance changes from 21 to Z5, surface roughness of the machined face does not become constant and changes as shown in FIG. 19(b).

DISCLOSURE OF THE INVENTION

The present invention has been accomplished to solve the above problems. It is an object of the present invention to provide an electric discharge machine enabling surface roughness of a machined face to be uniform by suppressing fluctuation of discharge electric power even if load impedance of electric discharge changes.

It is another object of the present invention to provide an electric discharge machine capable of suppressing reflected waves which are generated according to mismatching in the case of highly accurately machining a workpiece with a high frequency electric power source, so that the efficiency of inputting electric power into an electric discharge load can be improved and damage of a high frequency electric power unit caused by reflected electric power can be prevented.

The present invention provides an electric discharge machine in which high frequency electric power for working is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising: an electric power detecting means for detecting output electric power of the high frequency electric power unit; and a control means for controlling output electric power of the high frequency electric power unit to be constant on the basis of a difference between a machining command signal for giving a predetermined electric power command and an electric power detection value detected by the electric power detecting means.

The present invention provides an electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising: an electric power detecting means for detecting output electric power of DC electric power source of the high frequency electric power unit; and a control means for controlling output electric power of the DC electric power source to be constant on the basis of a difference between a machining command signal for giving a predetermined electric power command and an electric power detection value detected by the electric power detecting means.

The present invention provides an electric discharge machine, the electric power detecting means including: a voltage detecting means; an electric current detecting means; and a calculating means for calculating the product of a voltage detection value detected by the voltage detecting means and a current detection value detected by the current detecting means.

The present invention provides an electric discharge machine in which high frequency electric power for working is supplied between poles of an electrode and workpiece by a high frequency-electric power unit composed of a DC electric power source, oscillator and amplifier and impedance is adjusted by a matching circuit so as to generate electric discharge between the electrode and workpiece and conduct machining on the workpiece, the electric discharge machine comprising: a voltage detecting means for detecting output voltage V of the high frequency electric power unit; a current detecting means for detecting output current I of the high frequency electric power unit; a calculation means for calculating $\alpha \cdot V + \beta \cdot I$ where V is an output voltage detected by the voltage detection means, I is an output current detected by the current detection means and $\alpha$ and $\beta$ are predetermined coefficients; and a control means for controlling $\alpha \cdot V + \beta \cdot I$, which is an output of the electric power unit, to be constant on the basis of a difference between the predetermined working command signal and the calculation value of the calculation.

The present invention provides an electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising: a voltage detecting means for detecting output voltage V of the DC electric power source of the high frequency electric power unit; a current detecting means for detecting output current I of the DC electric power source of the high frequency electric power unit; a calculation means for calculating $\alpha \cdot V + \beta \cdot I$ where V is an output voltage detected by the voltage detection means, I is an output current detected by the current detection means and $\alpha$ and $\beta$ are predetermined coefficients; and a control means for controlling $\alpha \cdot V + \beta \cdot I$, which is an output of the electric power source, to be constant on the basis of a difference between the predetermined working command signal and the calculation value of the calculation means.

The present invention provides an electric discharge machine, further comprising an adjusting means for adjusting values of both coefficients $\alpha$ and $\beta$ or adjusting one of coefficients $\alpha$ and $\beta$.

The present invention provides an electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising: an electric power detecting means for detecting output electric power of the high frequency electric power unit; a control means for controlling output electric power of the high frequency electric power unit to be constant on the basis of a difference between a machining command signal for giving a predetermined electric power command and an electric power detection value detected by the electric power detecting means; and a resistor connected in parallel with the poles.

The present invention provides an electric discharge machine in which high frequency electric power for working is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising: an electric power detecting means for detecting output electric power of the high frequency electric power unit; a resistor connected in parallel with the poles; a loss detection means for detecting a loss caused by the resistor arranged between the poles; a calculation means for finding a difference between the output electric power detected by the electric power detection means and the loss detected by the loss detection means; and a control means for controlling a difference between the output electric power of the high frequency electric power unit and the loss by the resistor arranged between the poles on the basis of the working command signal for giving a predetermined electric power command and also on the basis of the calculation value of the calculation means.

The present invention provides an electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising: an electric power detecting means for detecting output electric power of the DC electric power source of the high frequency electric power unit; a control means for controlling output electric power of the DC electric power source to be constant on the basis of a difference between a machining command signal for giving a predetermined electric power command and an electric power detection value detected by the electric power detecting means; and a resistor connected in parallel with the poles.

The present invention provides an electric discharge machine in which high frequency electric power for working is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising: an electric power detecting means for detecting output electric power of the DC electric power source of the high frequency electric power unit; a resistor connected in parallel with the poles; a loss detection means for detecting a loss caused by the resistor arranged between the poles; a calculation means for finding a difference between the output electric power detected by the electric power detection means and the loss detected by the loss detection means; and a control means for controlling a difference between the output electric power of the DC electric power source of the high frequency electric power unit and the loss caused by the resistor arranged between the poles to be constant on the basis of the working command signal for giving a predetermined electric power command and also on the basis of the calculation value of the calculation means.

Since the electric discharge machine of the present invention is composed as described above, it is possible to provide the following effects. Even if load impedance fluctuates, it is possible to suppress the fluctuation of discharging electric power, and surface roughness of a machined face can be made uniform.

Further, it is possible to provide the above effects by an output control circuit of a simpler constitution. Therefore, an increase in the manufacturing cost can be suppressed.

Furthermore, when a workpiece is highly accurately machined with a high frequency electric power unit, it is possible to suppress the generation of reflected waves which are generated by mismatching. Therefore, the efficiency of inputting electric power into an electric discharge load can be improved, and the high frequency electric power unit can be prevented from being damaged by reflected electric power.

BRIEF DESCRIPTION OF DRAWINGS

FIGS. 19(a) and 19(b) are graphs showing an output of a DC electric power source and also showing surface roughness of a machined face of a workpiece with respect to load impedance in a conventional electric discharge machine.

BEST MODE FOR CARRYING OUT THE INVENTION

Embodiment 1

Figure 1:
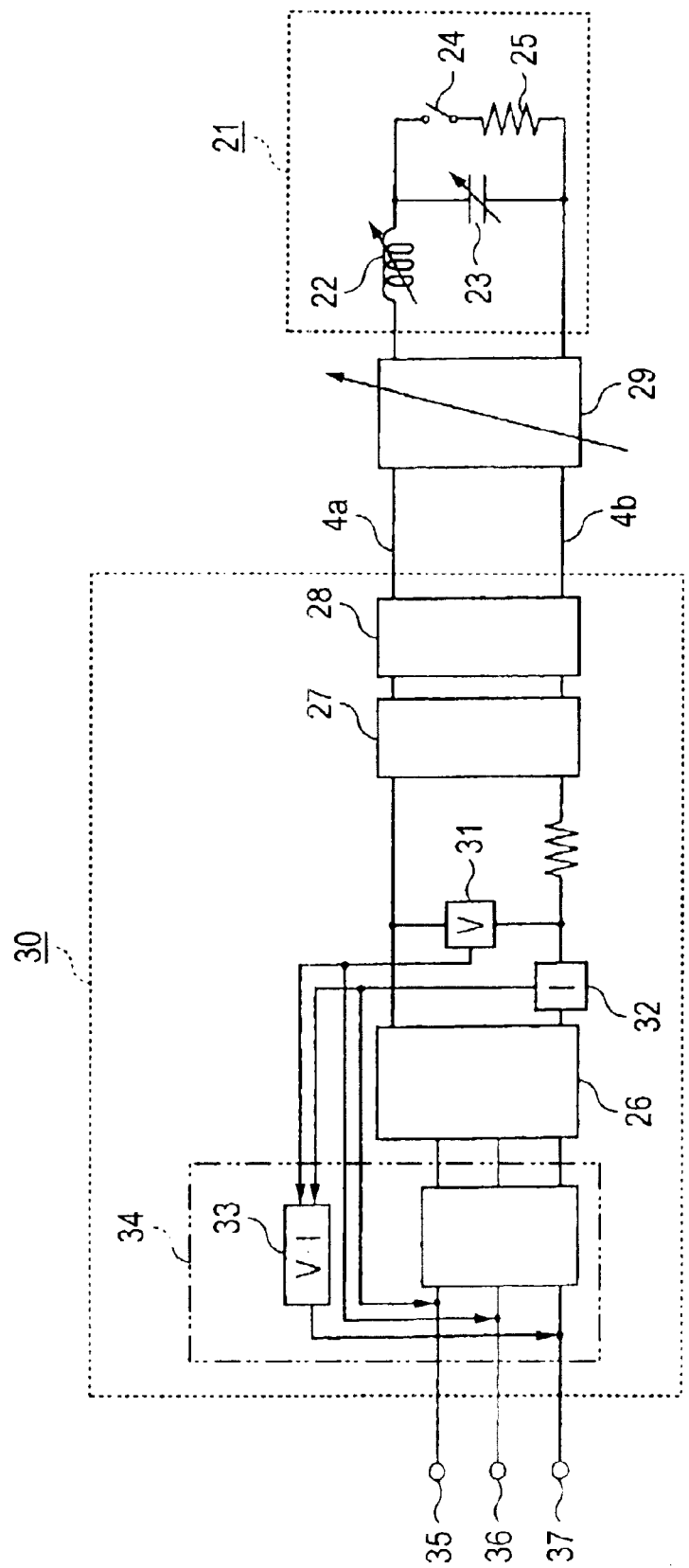
FIG. 1 is an arrangement view showing an equivalent circuit of an electric power unit and load section of an electric discharge machine of Embodiment 1 of the present invention.

FIG. 1 is an arrangement view showing an equivalent circuit of an electric power unit and load section of an electric discharge machine of Embodiment 1 of the present invention. In this embodiment, a high frequency electric power unit is used. In FIG. 1, reference numerals 4a and 4b are feeder lines, reference numeral 21 is a load section which is showed as an equivalent circuit between poles, reference numeral 22 is inductance, reference numeral 23 is capacitance, reference numeral 24 is a switch, reference numeral 25 is an electric discharge resistance, reference numeral 26 is a DC electric power source, reference numeral 27 is an oscillator, reference numeral 28 is an amplifier, reference numeral 29 is a matching circuit, reference numeral 30 is a high frequency electric power unit, reference numeral 31 is a voltage detection means, reference numeral 32 is a current detection means, reference numeral 33 is a calculation means for calculating the product of output voltage V and output current I of the DC electric power source 26 detected by the voltage detection means 31 and current detection means 32, reference numeral 34 is an output control circuit which is a control means for controlling an output of the DC electric power source 26, reference numeral 35 is a current restriction signal for restricting output current restriction value Imax of the DC electric power source 26, reference numeral 36 is a voltage restriction signal for restricting output voltage restriction value Vmax of the DC electric power source 26, and reference numeral 37 is a working command signal for restricting an output of the DC electric power source 26.

Next, operation will be explained below. Output voltage V and output current I of the DC electric power source 26 are respectively detected by the voltage detection means 31 and current detection means 32 and inputted into the output control circuit 34. The current restriction signal 35, voltage restriction signal 36 and working command signal 37 are inputted into the output control circuit 34.

The output control circuit 34 controls an output of the DC electric power source 26 on the basis of the above input signal so that product V·I of output voltage V and output current I can become constant in a region in which the voltage and current do not exceed the restriction values.

Figure 2:
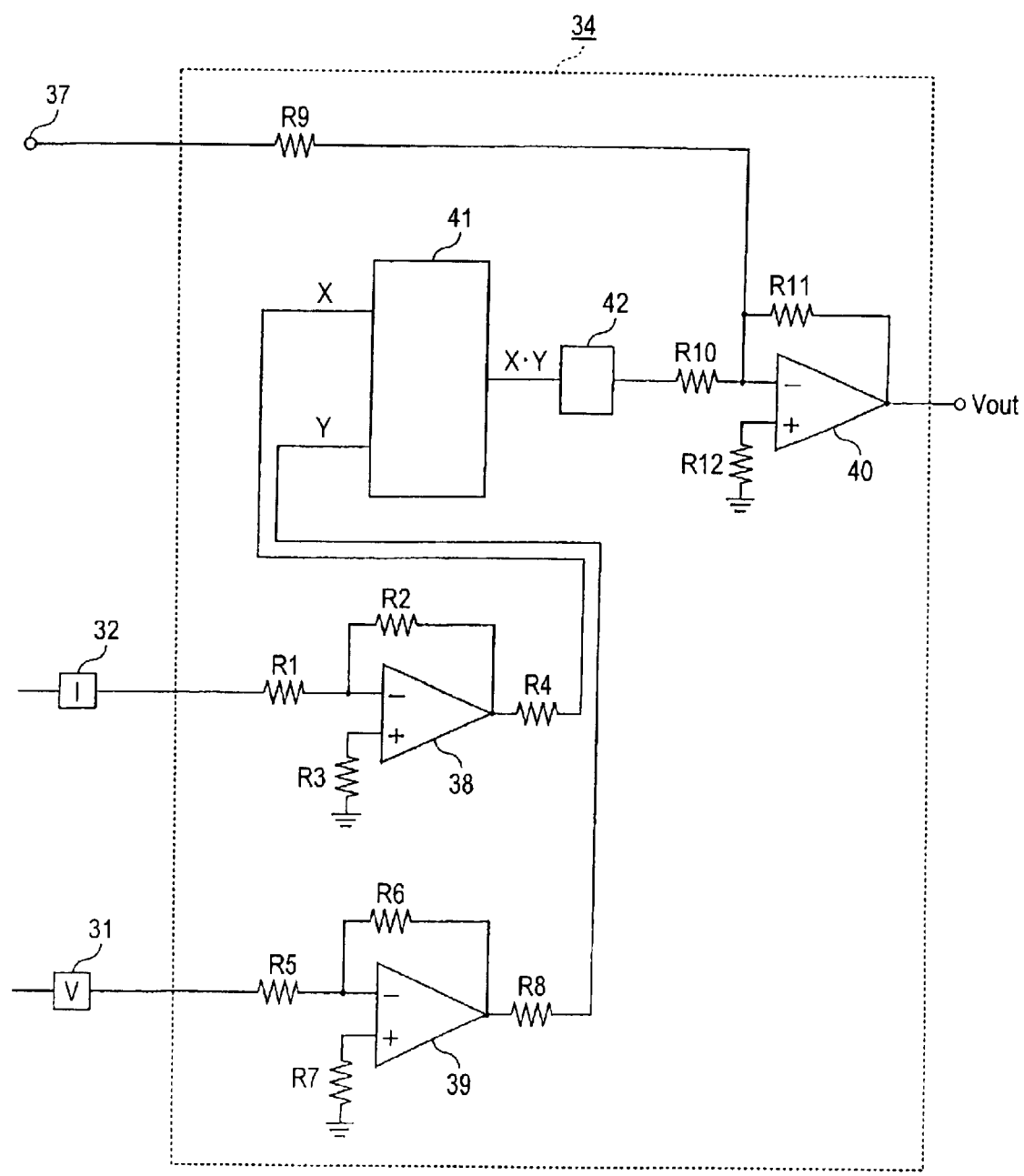
FIG. 2 is a circuit diagram showing an example of the constitution of an output control circuit of an electric power unit of an electric discharge machine of Embodiment 1 of the present invention.

FIG. 2 is a circuit diagram showing an example of the constitution of the output control circuit 34 of the high frequency electric power unit 30 of the electric discharge machine of Embodiment 1 of the present invention. In the drawing, reference numeral 31 is a voltage detection means, reference numeral 32 is a current detection means, reference numerals 38, 39 and 40 are operational amplifiers, R1 is a resistor arranged in the current detection signal input section, R2 is a resistor arranged in the feedback loop of the operational amplifier 38, R3 is an offset adjustment resistor connected with the operational amplifier 38, and R4 is a resistor arranged in the output section of the operational amplifier 38. R5 is a resistor arranged in the voltage detection signal input section, R6 is a resistor arranged in the feedback loop of the operational amplifier 39, R7 is an offset adjustment resistor connected with the operational amplifier 39, and R8 is a resistor arranged in the output section of the operational amplifier 39. Reference numeral 41 is a multiplier, reference numeral 42 is an inverse amplifier, Vout is a control signal sent to the DC electric power source, R9 is a resistor arranged in the working command signal input section, R10 is a resistor connected with the input section of the operational amplifier 40, R11 is a resistor arranged in the feedback loop of the operational amplifier 40, and R12 is an offset adjustment resistor connected with the operational amplifier 40.

Next, operation will be explained below. A current detection signal, which is detected by the current detection means 32 and inputted into the output control circuit 34, is inversely amplified by the operational amplifier 38 at the gain of −R2/R1 and then outputted. This gain is determined corresponding to a working command signal in the later stage. In the same manner, a voltage detection signal, which is detected by the voltage detection means 31 and inputted into the output control circuit 34, is inversely amplified by the operational amplifier 39. The current detection signal and voltage detection signal, which have been inversely amplified, are respectively inputted into X and Y terminals of each multiplier 41, and product X·Y is outputted from the multiplier 41. Product X·Y is inputted into the operational amplifier 40 via the inverse amplifier 42.

When a difference between the working command signal 37 and product X·Y (Product X·Y corresponds to product V·I of output voltage V and output current I.) is amplified by the inverse amplifier 40 and made to be control signal Vout to be given to the DC electric power source 26 as described above, an output of the DC electric power source 26 is controlled, so that product V·I of output voltage V and output current I of the DC electric power source 26 can be controlled constant.

Figure 3:
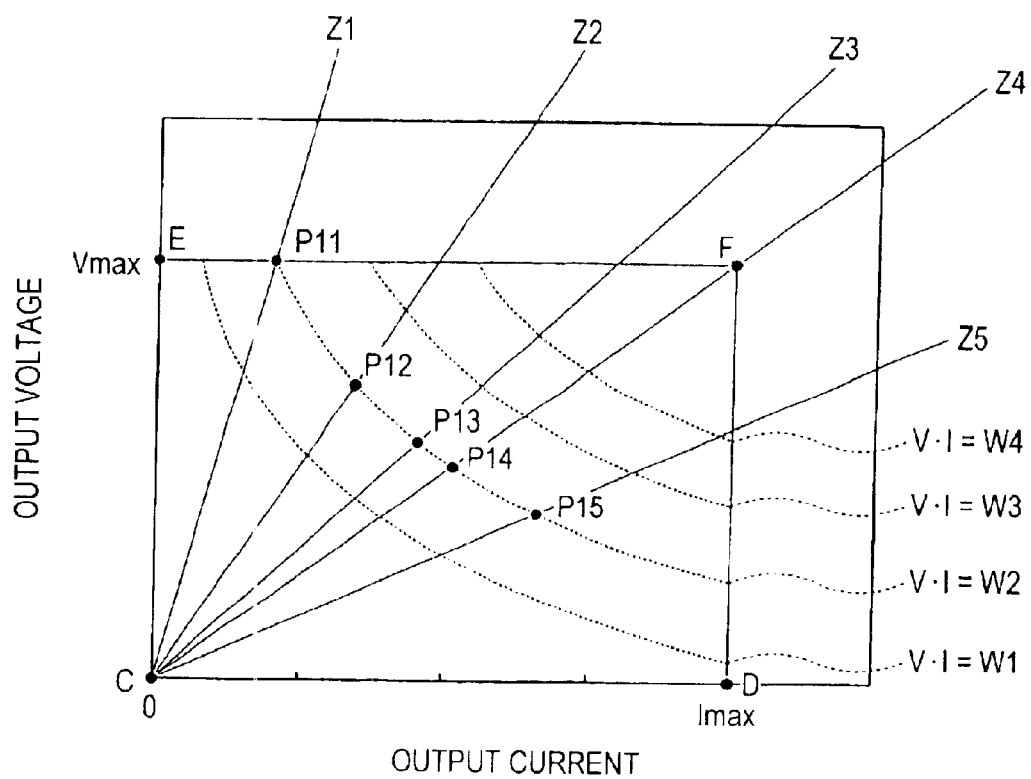
FIG. 3 is a graph showing an operation point of a DC electric power source when load impedance with respect to the DC electric power source of an electric discharge machine of Embodiment 1 of the present invention changes.

FIG. 3 is a graph showing an operation point of the DC electric power source when load impedance with respect to the DC electric power source is changed. Each of the characteristic curves of V·I=$W_1$, V·I=$W_2$, V·I=$W_3$ and V·I=$W_4$ expresses an output characteristic when output electric power V·I of the DC electric power source 26 is controlled constant. The characteristic curve, on which the operation point of the DC electric power source 26 is moved, is determined by selecting the output electric power according to the working command signal 37. The operation point in this case is a point of intersection of the characteristic curve of load impedance Z with respect to the DC electric power source and the output characteristic curve of the DC electric power source. For example, when V·I=$W_2$ is selected as an output characteristic curve -of the DC electric power source 26, the operation points are points of intersection $P_{11}$, $P_{12}$, $P_{13}$, $P_{14}$ and $P_{15}$ of load characteristic curves $Z_1$, $Z_2$, $Z_3$, $Z_4$ and $Z_5$ with output characteristic curve $W_2$.

Figure 4:
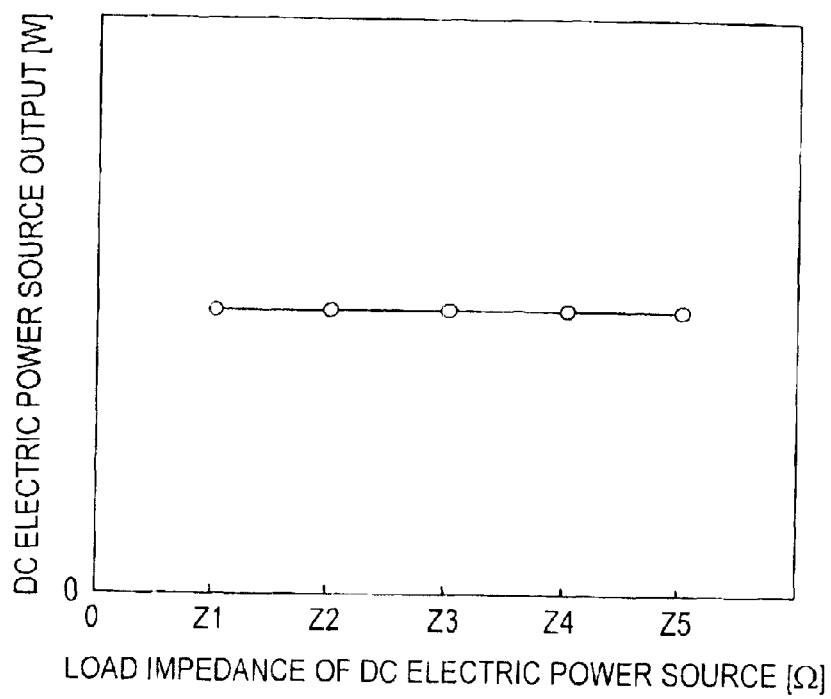
FIGS. 4(a) and 4(b) are graphs showing an output of a DC electric power source and also showing surface roughness of a machined face with respect to load impedance in an electric discharge machine of Embodiment 1 of the present invention.
Figure 4:
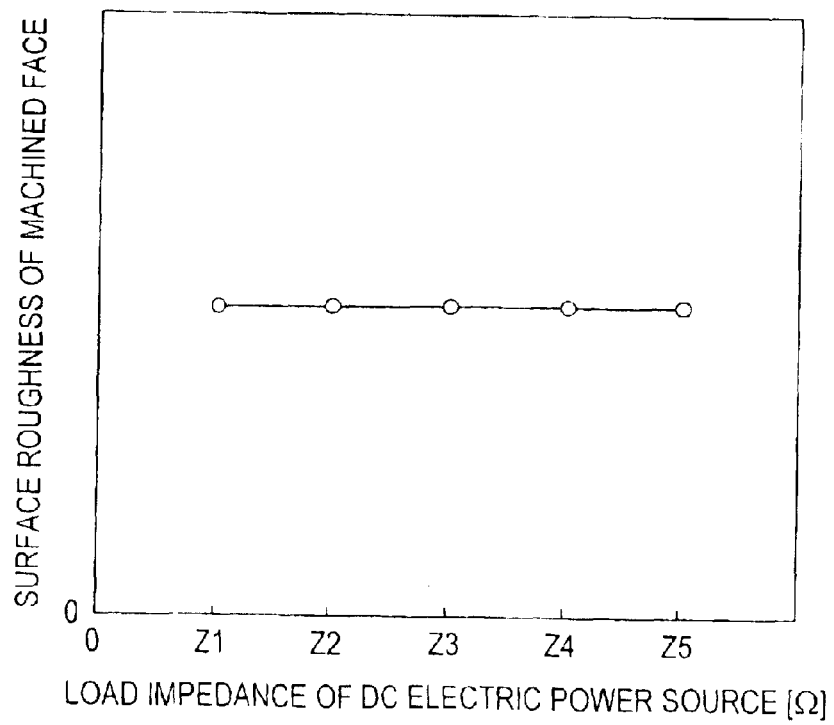

As described above, the operation point in the case where load impedance Z changes with respect to the DC electric power source 26 moves so that the output electric power can be kept constant. Accordingly, the output electric power of the DC electric power source 26 becomes constant irrespective of the change in load impedance as shown in FIG. 4(a). Therefore, when electric discharge machining is conducted by the electric discharge machine provided with the high frequency electric power unit 30, surface roughness of a machined face of a workpiece becomes uniform without being affected by load impedance as shown in FIG. 4(b).

The above explanations are made into a case shown in FIGS. 1 and 2 in which output voltage V and output current I of the DC electric power source 26 are respectively detected by the voltage detection means 31 and current detection means 32 so that an output of the DC electric power source 26 can be controlled with output voltage V and output current I. However, the voltage detection means 31 and current detection means 32 may be arranged in the output section of the high frequency electric power unit 30. In this case, the output of the high frequency electric power unit 30 is controlled constant. Especially when linearity of the oscillator 27 and amplifier 28 with respect to the DC electric power source 26 is not good, the above constitution is advantageous in that fluctuation of surface roughness on a machine face can be more accurately suppressed.

In the above explanations, the product of output voltage and output current, which are respectively detected by the voltage detection means 31 and current detection means 32, is calculated by the calculation means 33 so as to find the electric power. However, other electric power detection means for detecting electric power such as a high frequency power detector may be used.

The above explanations are made into an electric discharge machine provided with a high frequency electric power unit used for machining a workpiece highly accurately. However, it should be noted that the present invention is not limited to the electric discharge machine provided with a high frequency electric power unit. The same output control may be conducted on an electric discharge machine provided with an electric power unit used for machining a workpiece roughly.

Embodiment 2

Figure 5:
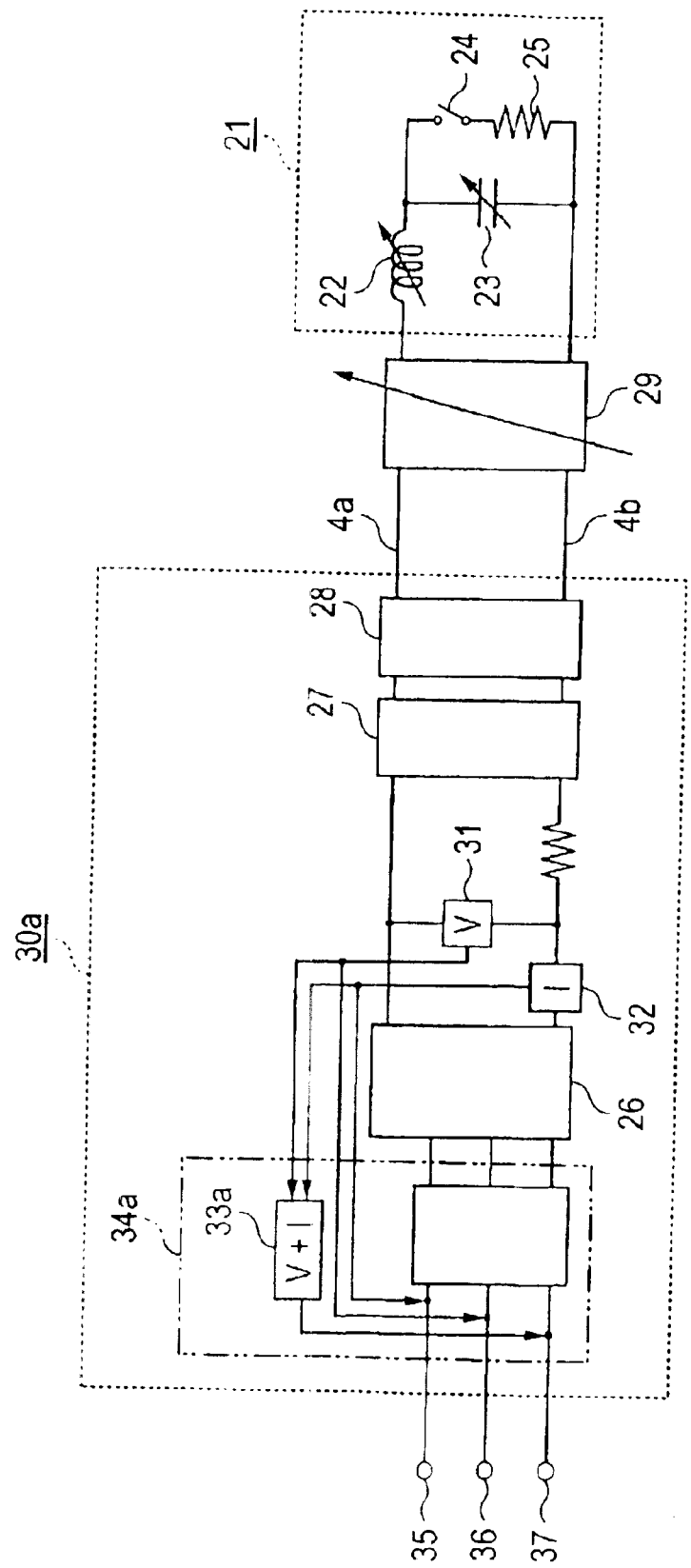
FIG. 5 is an arrangement view showing an equivalent circuit of an electric power unit and load section of an electric discharge machine of Embodiment 2 of the present invention.

FIG. 5 is an arrangement view showing an equivalent circuit of an electric power unit and load section of an electric discharge machine of Embodiment 2 of the present invention. Like reference characters are used to indicate like parts in FIG. 1 showing Embodiment 1 and FIG. 5 showing Embodiment 2. In this embodiment 2, a high frequency electric power unit is also used. In FIG. 5, reference numeral 30a is a high frequency electric power unit, reference numeral 33a is a calculation means for calculating the sum of output voltage V and output current I of the DC electric power source 26, and reference numeral 34a is an output control circuit which is a control means for controlling an output of the DC electric power source 26. Embodiment 1 uses the calculation means 33 for calculating the product of output voltage V and output current I of the DC electric power source 26. However, Embodiment 2 uses the calculation means 33a for conducting an addition of output voltage V and output current I of the DC electric power source 26 instead of the calculation means 33.

Figure 6:
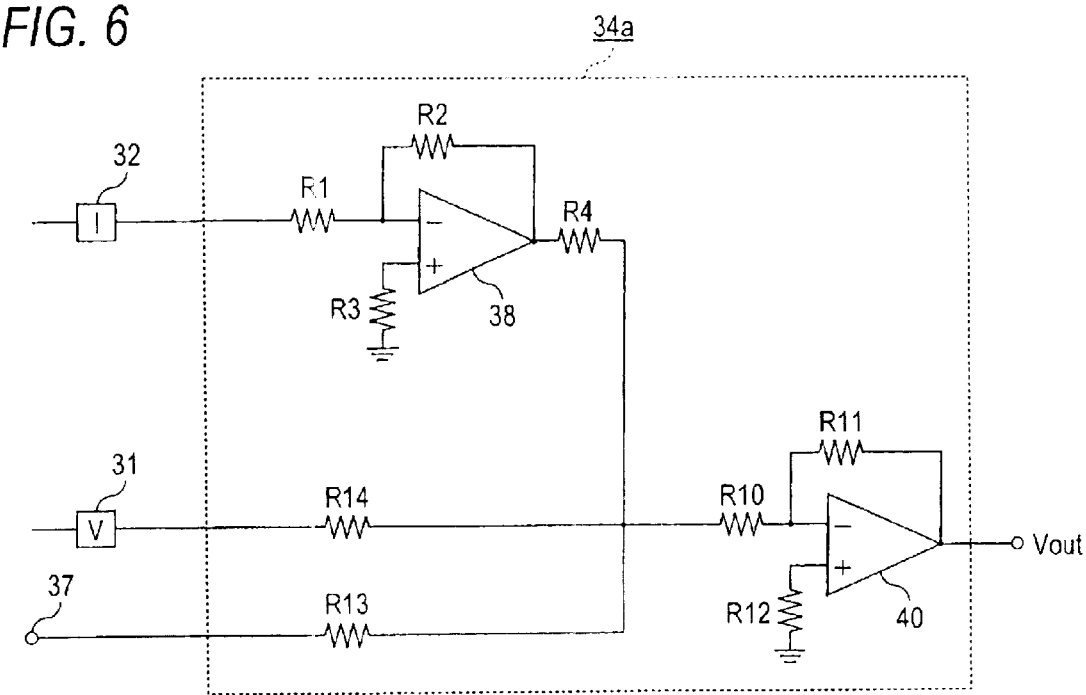
FIG. 6 is a circuit diagram showing an example of the constitution of an output control circuit of an electric power unit of an electric discharge machine of Embodiment 2 of the present invention.

FIG. 6 is a circuit diagram showing an example of the constitution of an output control circuit 34a of an electric power unit of an electric discharge machine of Embodiment 2 of the present invention. Like reference characters are used to indicate like parts in FIG. 2 showing Embodiment 1 and FIG. 6 showing Embodiment 2. Components of the same reference numeral conduct the same operation. R13 is a resistor arranged in the working command input section, and R14 is a resistor arranged in the voltage detection signal input section. In this case, the voltage detection signal is detected as a negative signal.

Due to the circuit structure shown in FIG. 6, a difference between the working command signal 37 and α·V+β·I (V is an output voltage of the DC electric power source 26, I is an output current of the DC electric power source 26, and α and β are coefficients which are predetermined.) becomes a control signal Vout sent to the DC electric power source 26. Therefore, the output of the DC electric power source 26 is controlled so that $\alpha \cdot V + \beta \cdot I$ can be constant. In this case, $\alpha$ and $\beta$ are coefficients determined by gains of the operational amplifiers 38 and 40.

Figure 7:
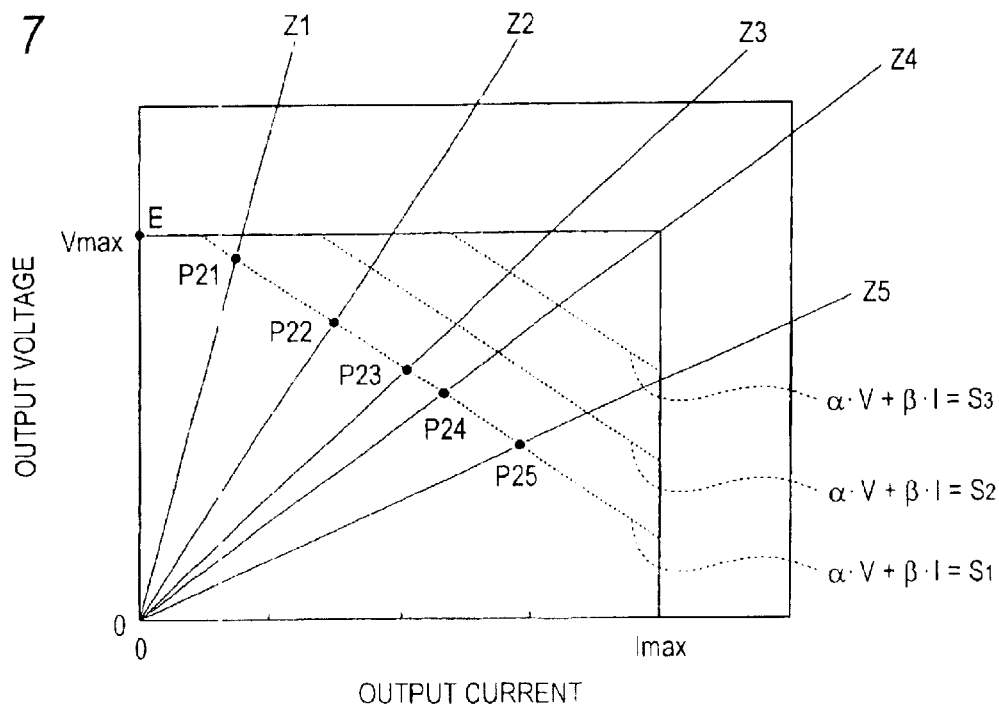
FIG. 7 is a graph showing an operation point of a DC electric power source when load impedance with respect to the DC electric power source of an electric discharge machine of Embodiment 2 of the present invention changes.

Operation points of the DC electric power source composed as illustrated in FIGS. 5 and 6 are shown in FIG. 7. In FIG. 7, each of the characteristic curves of $\alpha \cdot V + \beta \cdot I = S_1$, $\alpha \cdot V + \beta \cdot I = S_2$ and $\alpha \cdot V + \beta \cdot I = S_3$ expresses an output characteristic when output electric power $\alpha \cdot V + \beta \cdot I$ of the DC electric power source 26 is controlled constant. The characteristic curve, on which the operation point of the DC electric power source 26 is moved, is determined by selecting the output characteristic (for example S1 to S3) according to the working command signal 37. The operation point in this case is a point of intersection of the characteristic curve of load impedance Z with respect to the DC electric power source and the output characteristic curve of the DC electric power source. For example, when $\alpha \cdot V + \beta \cdot I = S_1$ is selected as an output characteristic curve of the DC electric power source 26, the operation points of the DC electric power source are points of intersection $P_{21}, P_{22}, P_{23}, P_{24}$ and $P_{25}$ of load characteristic curves $Z_1, Z_2, Z_3, Z_4$ and $Z_5$ with output characteristic curve $S_1$. As described above, the operation point in the case where load impedance changes with respect to the DC electric power source 26 moves on a straight line so that $\alpha \cdot V + \beta \cdot I$ can be kept constant. Accordingly, it becomes possible to conduct DC electric power source output control which is close to control shown in FIG. 3 of Embodiment 1 in which the output electric power is controlled being kept constant.

Figure 8:
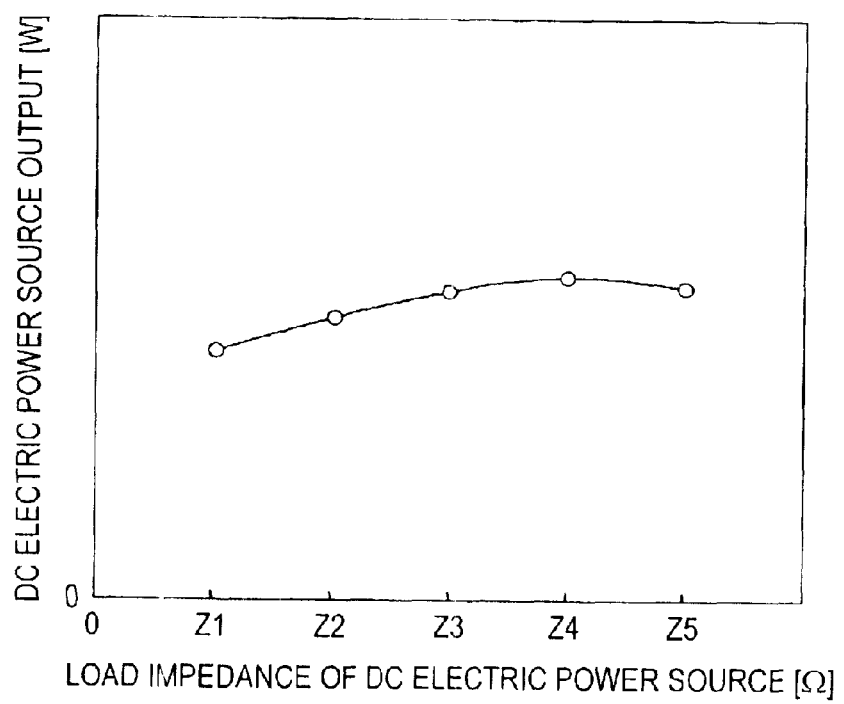
FIGS. 8(a) and 8(b) are graphs showing an output of a DC electric power source and also showing surface roughness of a machined face with respect to load impedance in an electric discharge machine of Embodiment 2 of the present invention.
Figure 8:
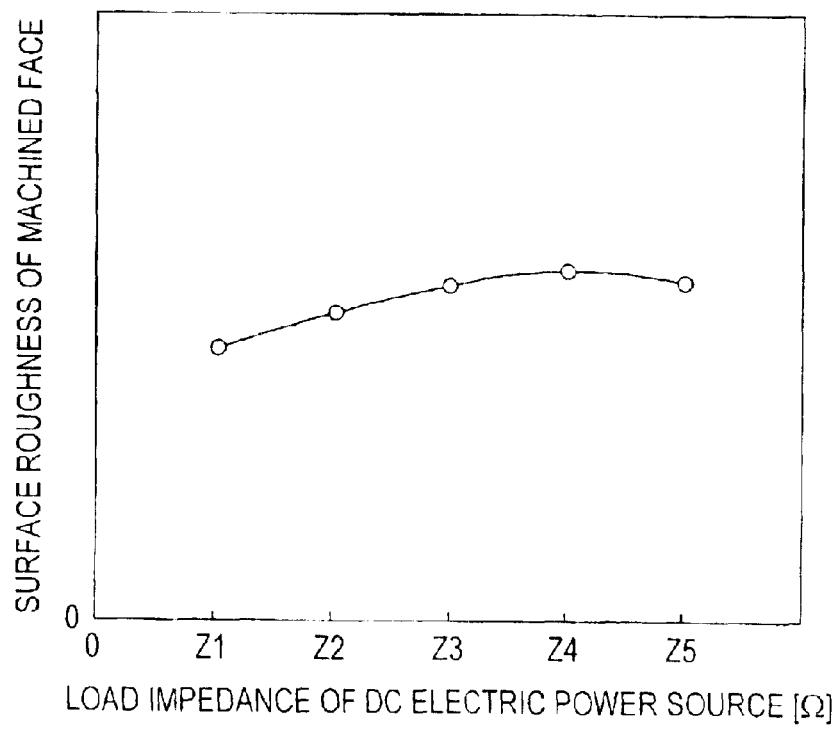

An example of the DC electric power source output at operation points $P_{21}, P_{22}, P_{23}, P_{24}$ and $P_{25}$ shown in FIG. 7 is shown in FIG. 8(a). As shown in FIG. 7, control is conducted in such a manner that the characteristic in which the output electric power is kept constant is approximated to a straight line. Therefore, the DC electric power source output is not perfectly constant with respect to the fluctuation of load impedance. However, it is possible to obtain a greatly stabilized DC electric power source output compared with the example described in the background art shown in FIG. 19(a). Due to the foregoing, surface roughness of a machined face in the case where load impedance is changed can be greatly improved as shown in FIG. 8(b).

When the constitution of the output control circuit 34a shown in FIG. 6 is adopted, the circuit constitution can be simplified as compared with the output control circuit 34 shown in FIG. 2 of Embodiment 1. Therefore, the manufacturing cost can be reduced.

Embodiment 3

Figure 9:
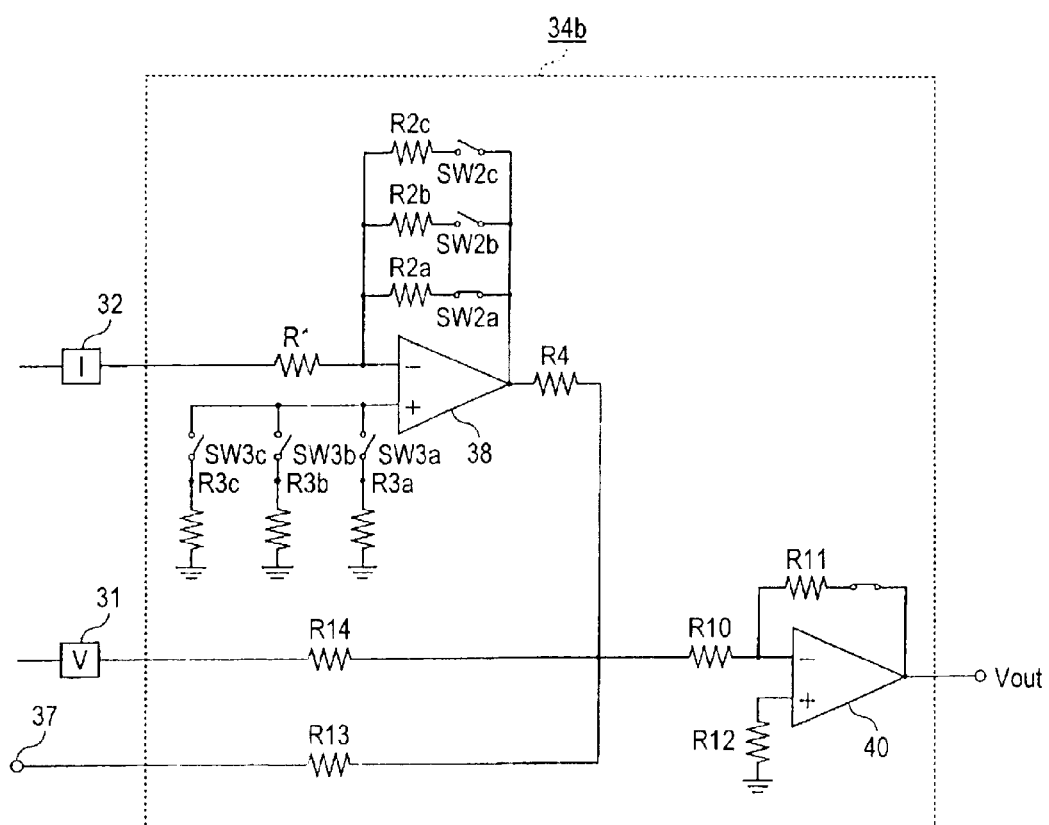
FIG. 9 is a circuit diagram showing an example of the constitution of an output control circuit of an electric power unit of an electric discharge machine of Embodiment 3 of the present invention.

FIG. 9 is a circuit diagram showing an example of the constitution of the output control circuit 34b which is a control means for controlling an output of the DC electric power source of the electric power unit of the electric discharge machine of Embodiment 3 of the present invention. Like reference characters are used to indicate like parts in FIG. 6 showing Embodiment 2 and FIG. 9 showing Embodiment 3. Components of the same reference numeral conduct the same operation. In the circuit diagram shown in FIG. 9, R2a, R2b and R2c are resistors arranged in parallel with the feedback loop of the operational amplifier 38, and SW2a, SW2b and SW2c are switches arranged in series to resistors R2a, R2b and R2c. R3a, R3b and R3c are resistors connected with the operational amplifier 38, and SW3a, SW3b and SW3c are switches arranged in series to the resistors R3a, R3b and R3c. The high frequency electric power unit of the electric discharge machine of this Embodiment 3 is the same as that of Embodiment 2 shown in FIG. 5.

A current detection signal, which is inputted into the output control circuit 34a shown in FIG. 6 and detected by the current detection means 32, is inversely amplified by the operational amplifier 38 at the gain of about $-R2/R1$. In the circuit constitution of Embodiment 3 shown in FIG. 9, resistor R2 to determine the gain of the operational amplifier 38 is composed of R2a, R2b and R2c, the resistance values of which are different from each other, and the resistance value can be selected by switches SW2a, SW2b and SW2c. Resistors R3a, R3b and R3c shown in FIG. 9 are resistors for adjusting offset in the same manner as resistor R3 shown in FIG. 6. In this case, the resistor of the feedback loop of the operational amplifier 38 may be switched to R2a, R2b or R2c. At the same time, resistors R3a, R3b or R3c may be switched by switches SW3a, SW3b or SW3c.

Figure 10:
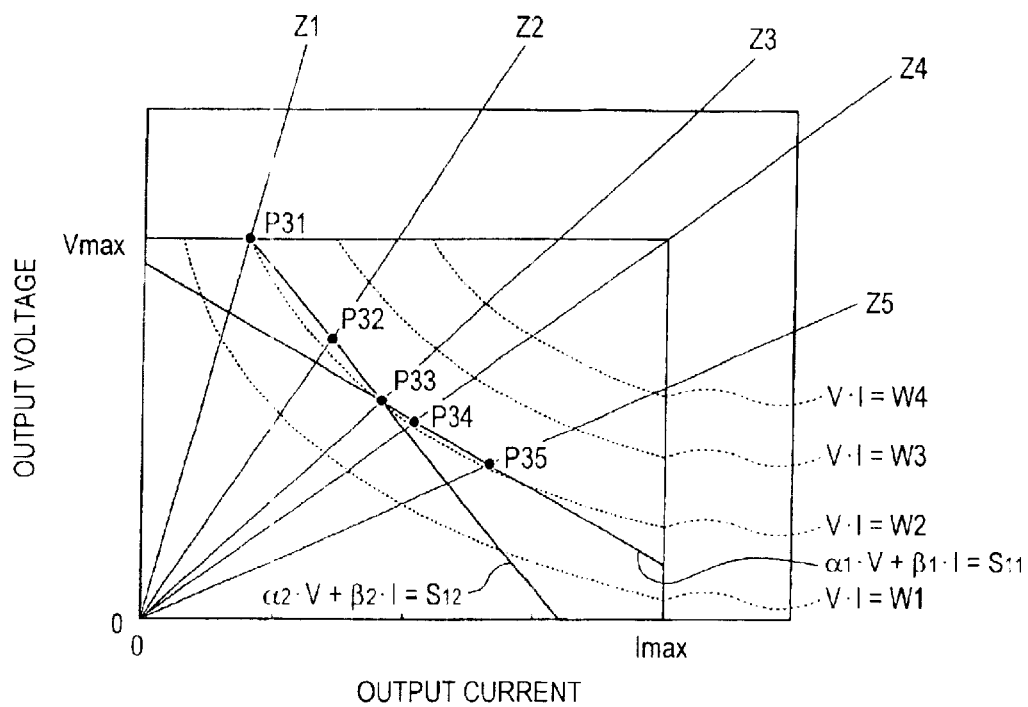
FIG. 10 is a graph showing an operation point of a DC electric power source when load impedance with respect to the DC electric power source of an electric discharge machine of Embodiment 3 of the present invention changes.

Operation points of the DC electric power source 26, which is controlled by the output control circuit 34b composed as shown in FIG. 9, are shown in FIG. 10. Characteristic curves of $V \cdot I = W_1$, $V \cdot I = W_2$, $V \cdot I = W_3$ and $V \cdot I = W_4$, which are shown by dotted lines in FIG. 10, are characteristic curves in the case where output voltage $V \cdot I$ of the DC electric power source 26 becomes constant. Characteristic curves of $\alpha_1 \cdot V + \beta_1 \cdot I = S_{11}$ and $\alpha_2 \cdot V + \beta_2 \cdot I = S_{12}$ shown by solid lines are characteristic curves in the case where output $\alpha n \cdot V + \beta n \cdot I$ ($\alpha n$ and $\beta n$ are coefficients which are predetermined.) of the DC electric power source 26 is controlled so that they can be a constant value. In FIG. 9, for example, when it is assumed that the characteristic curve is $\alpha_1 \cdot V + \beta_1 \cdot I = S_{11}$ in the case where switch SW2a is turned on and the characteristic curve is $\alpha_2 \cdot V + \beta_2 \cdot I = S_{12}$ in the case where switch SW2b is turned on, as shown in FIG. 10, in the range of impedance fluctuation of $Z = Z_3$ to $Z_5$, the characteristic curve $\alpha_1 \cdot V + \beta_1 \cdot I = S_{11}$ approximates to the characteristic in which the output electric power is constant ($V \cdot I = W_2$ shown in FIG. 10), and in the range of impedance fluctuation of $Z = Z_1$ to $Z_3$, the characteristic curve $\alpha_2 \cdot V +_2 \cdot I = S_{12}$ approximates to the characteristic in which the output electric power is constant ($V \cdot I = W_2$ shown in FIG. 10).

The fluctuation range of load impedance is changed according to the working condition such as thickness and profile of a workpiece. It is possible to more accurately control an output of the DC electric power source 26 when the gain is switched by an adjusting means for adjusting the gain by switching resistors R2a, R2b and R2c of the operational amplifier 38 shown in FIG. 9 by using switches SW2a, SW2b and SW2c. For example, when the thickness of a workpiece is t1, the fluctuation range of load impedance is $Z = Z_4$ to $Z_5$ and when the thickness of a workpiece is t2, the fluctuation range of load impedance is $Z = Z_1$ to $Z_2$, and the output electric power of the DC electric power source 26 can be more accurately controlled as follows. In the case where a portion of the workpiece, the thickness of which is t1, is machined, switch SW2a is turned on in FIG. 9 and the characteristic curve $\alpha_1 \cdot V + \beta_1 \cdot I = S_{11}$ is used. In the case where a portion of the workpiece, the thickness of which is t2, is machined, switch SW2b is turned on in FIG. 9 and the characteristic curve $\alpha_2 \cdot V + \beta_2 \cdot I = S_{12}$ is used. When switching operation is conducted in this way, the output electric power of the DC electric power source 26 can be more accurately controlled. When operation is conducted as described above, operation points in the case where load impedance is changed in the range of $Z = Z_1$ to $Z_5$ can be made to be $P_{31}$, $P_{32}, P_{33}, P_{34}$ and $P_{35}$ shown in FIG. 10.

Figure 11:
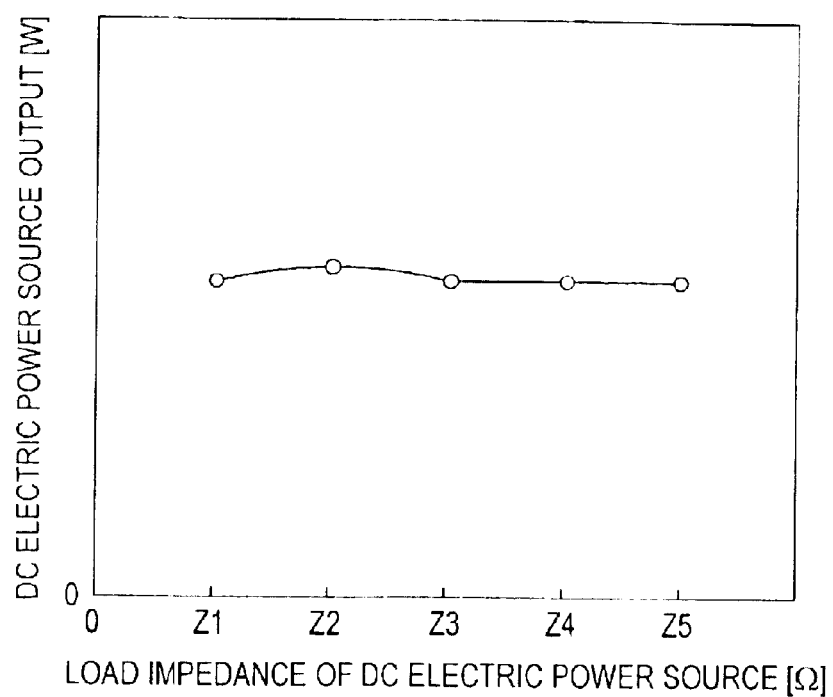
FIGS. 11(a) and 11(b) are graphs showing an output of a DC electric power source and also showing surface roughness of a machined face with respect to load impedance in an electric discharge machine of Embodiment 3 of the present invention.
Figure 11:
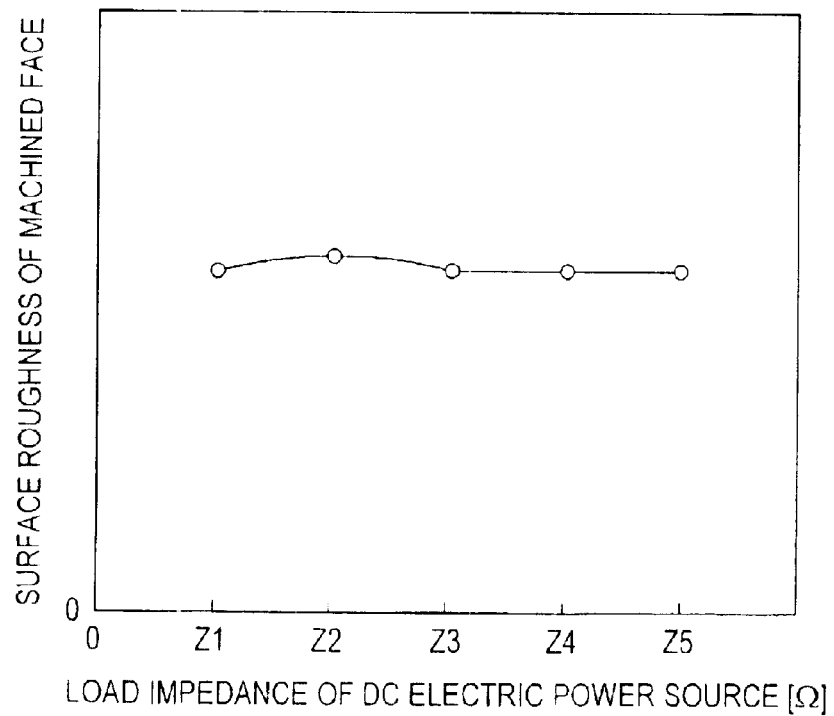

FIG. 11 is a view showing an output of a DC electric power source and also showing surface roughness of a machined face with respect to load impedance in an electric discharge machine of Embodiment 3 of the present invention. FIG. 11(a) is a view showing outputs of DC electric power at operation points $P_{31}$, $P_{32}$, $P_{33}$, $P_{34}$ and $P_{35}$ in FIG. 10. It can be understood that the output characteristic is more improved than the case of Embodiment 2 shown in FIG. 8(a). According to the improvement in the output characteristic, as shown in FIG. 11(b), surface roughness on a machined face in the case where load impedance fluctuates can be more improved than the case shown in FIG. 8(b).

As described above, when the output control circuit 34b, the constitution of which is simple as shown in FIG. 9, is adopted, the output electric power characteristic can be made closer to that shown in Embodiment 1 than that of output control circuit 34a shown in FIG. 6 of Embodiment 2.

When the output control circuit 34b shown in FIG. 9 is adopted, the circuit constitution can be simplified as compared with the constitution of the output control circuit 34 of Embodiment 1 shown in FIG. 2. Therefore, the manufacturing cost can be reduced.

The above explanations are made into an example in which resistors R2a, R2b and R2c are switched as a means for adjusting the gain of the operation amplifier 38 as shown in FIG. 9, however, the means for adjusting the gain of the operation amplifier 38 is not limited to the above specific example, but an adjusting means for switching resistor R1 may be adopted. The number of resistors to be switched is not limited to three.

The above explanations are made into a system in which a change-over switch is used as a gain adjusting means of the operational amplifier 38. However, the gain adjusting means is not limited to-the above specific example. For example, the following adjusting means may be used. Variable resistors are used as resistors R2 and R3 in Embodiment 2 shown in FIG. 6, and values of resistance of the variable resistors are adjusted according to the working condition.

Embodiment 4

In Embodiments 1 to 3, for example, as shown in FIGS. 4(a), 8(a) and 11(a), the output fluctuation of the DC electric power source can be suppressed. Therefore, it is possible to suppress the output fluctuation of the high frequency electric power unit. However, when mismatching in the matching circuit is intense because the load fluctuates greatly in the electric discharge machining process, the occurrence of reflected waves is increased because a reduction of the output of the high frequency electric power unit is suppressed.

Figure 12:
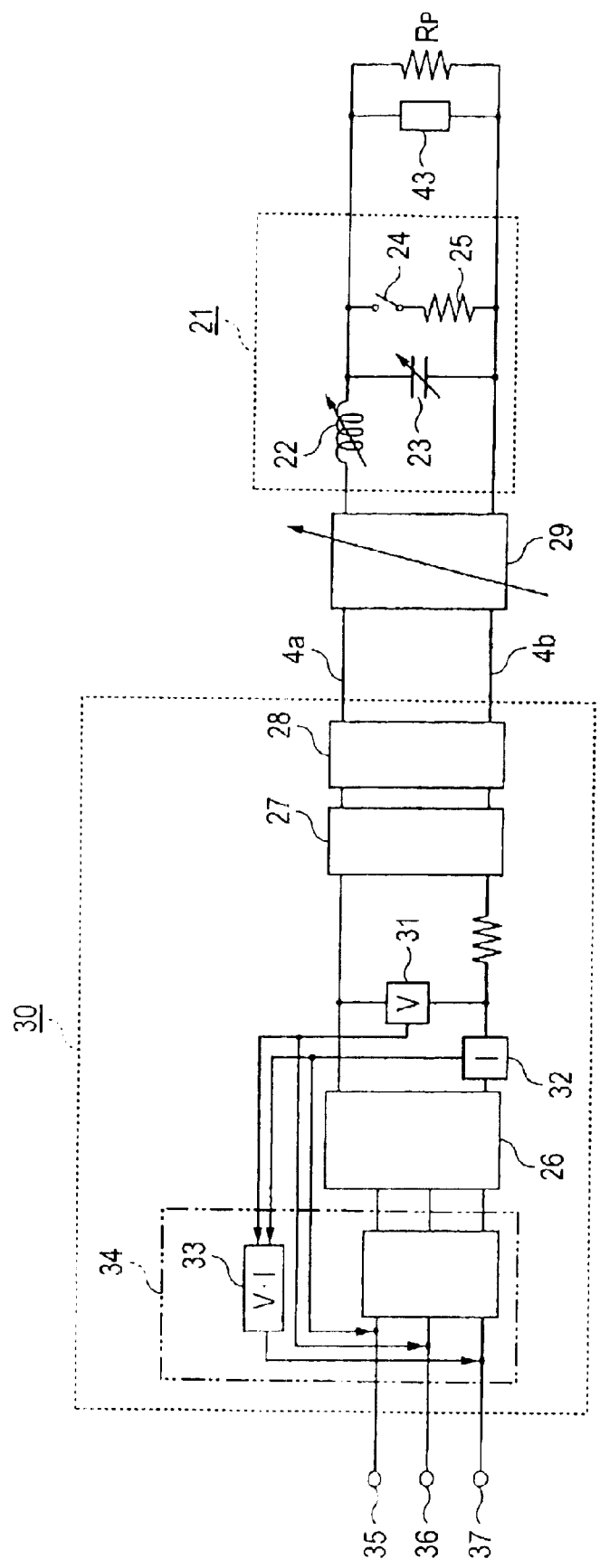
FIG. 12 is an arrangement view showing an equivalent circuit of a high frequency electric power unit and load section of an electric discharge machine of Embodiment 4 of the present invention.

In Embodiment 4, the above increase in the reflected waves is prevented. FIG. 12 is an arrangement view showing an equivalent circuit of a high frequency electric power unit and load section of an electric discharge machine of Embodiment 4 of the present invention. Like reference characters are used to indicate like parts in FIG. 1 showing Embodiment 1 and FIG. 12 showing Embodiment 4. In the drawing, Rp is a resistor connected in parallel between the poles, and reference numeral 43 is a voltage detection means connected in parallel with resistor Rp.

Figure 13:
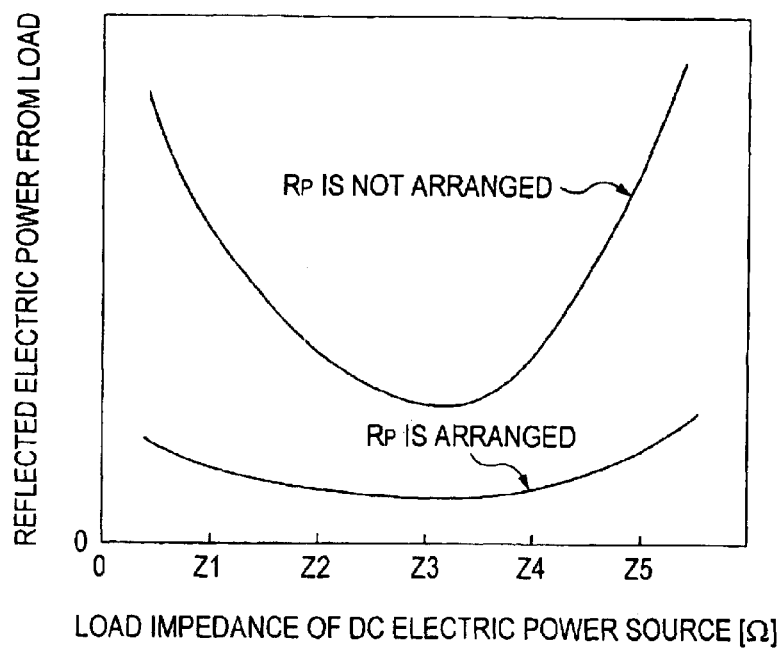
FIG. 13 is a graph showing a change in reflected electric power from the load side in the case where a resistor is connected in parallel with the poles and also showing a change in reflected electric power from the load side in the case where a resistor is not connected in parallel with the poles.
Figure 14:
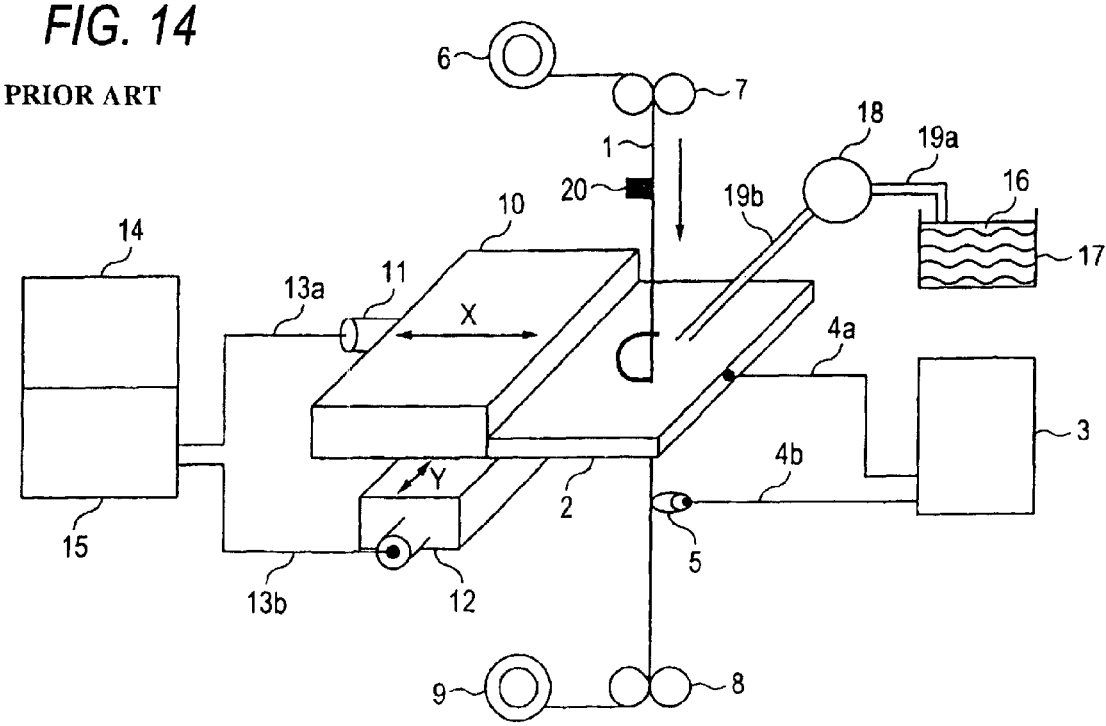
FIG. 14 is a schematic illustration showing an arrangement of a conventional electric discharge machine.
Figure 15:
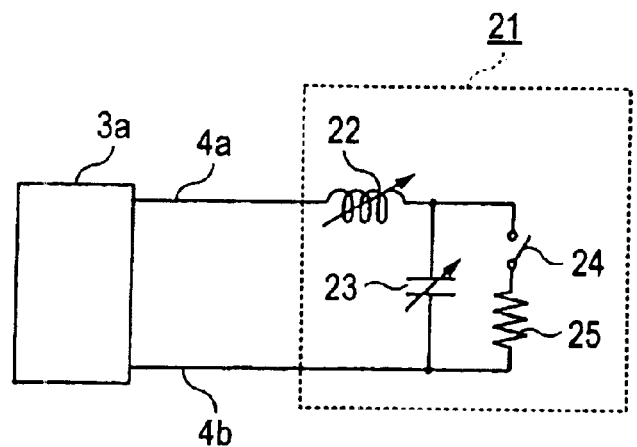
FIG. 15 is an arrangement view showing an equivalent circuit of an electric power unit and load section in the case of machining a workpiece at high speed by a conventional electric discharge machine.
Figure 16:
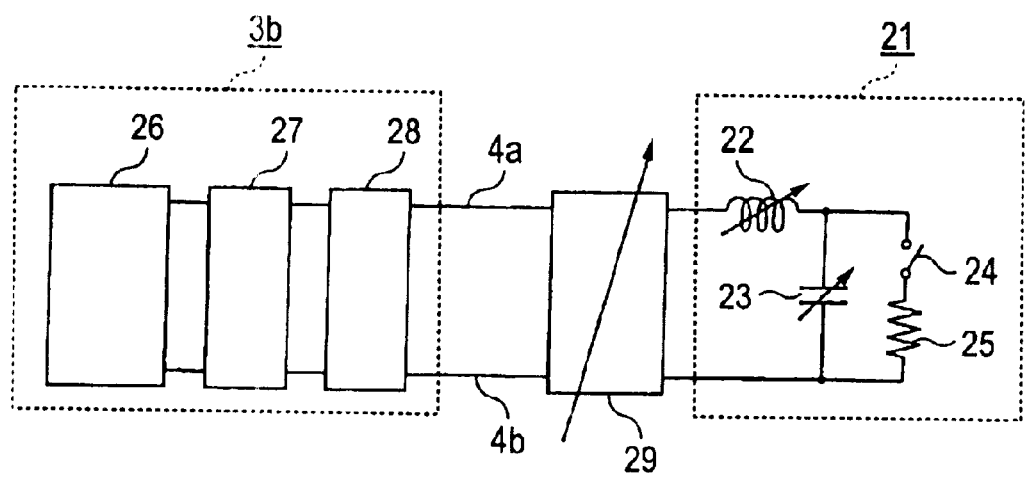
FIG. 16 is an arrangement view showing an equivalent circuit of an electric power unit and load section in the case of machining a workpiece with high accuracy by a conventional electric discharge machine.
Figure 17:
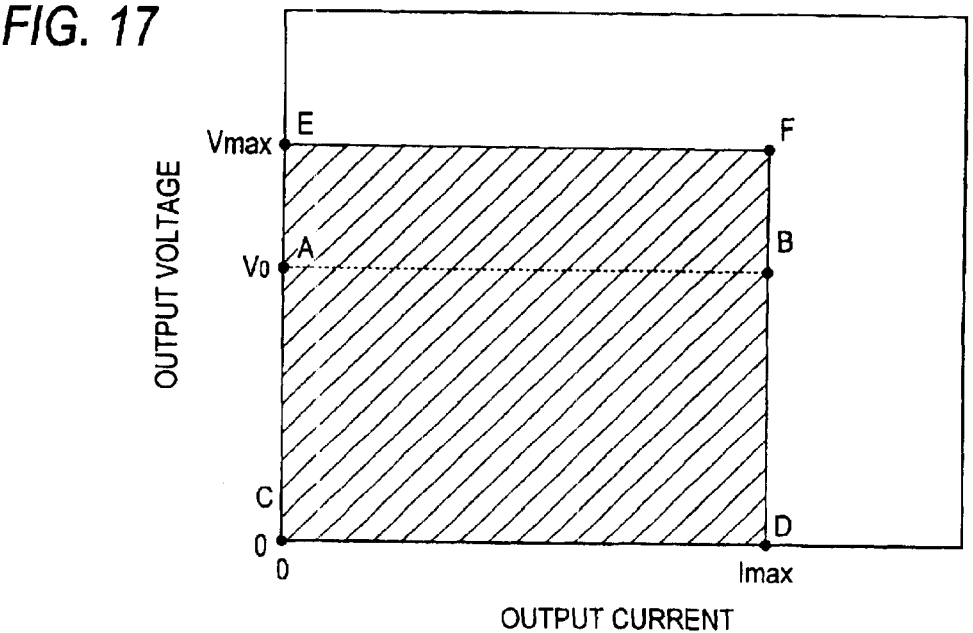
FIG. 17 is a schematic illustration showing an operation region of an output current and output voltage of a DC electric power source composing a high frequency electric power unit of a conventional electric discharge machine.
Figure 18:
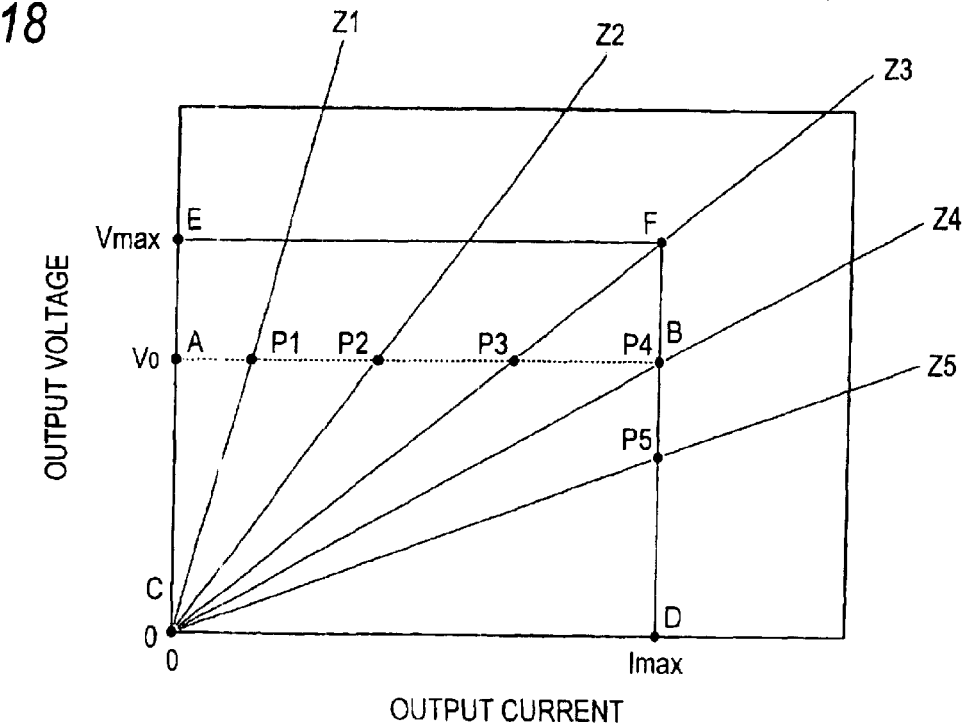
FIG. 18 is a schematic illustration showing an operation point of a DC electric power source in the case where load impedance changes in a conventional electric discharge machine.

The higher the value Q which is sharpness of impedance between the poles, the larger the impedance fluctuation between the poles. Therefore, when the value Q between the poles is decreased, the load fluctuation caused in the process of machining can be suppressed. Resistor Rp shown in FIG. 12 is provided for the purpose of decreasing the value Q of impedance between the poles. FIG. 13 is a graph showing a change in the reflected electric power from the load side when resistor Rp is arranged and-also showing a change in the reflected electric power from the load side when resistor Rp is not arranged. When resistor Rp is arranged, the impedance fluctuation between the poles can be suppressed, so that mismatching in the matching circuit can be reduced. Therefore, the reflected waves generated according to the mismatching can be suppressed. Due to the foregoing, the efficiency of inputting electric power into an electric discharge load can be improved and damage of the high frequency electric power unit caused by reflected electric power can be prevented.

The above explanations are made into a case in which the resistor is connected between the poles. However, in the case where the load fluctuation between the poles is caused by the inductance fluctuation or capacitance fluctuation, the inductance or capacitance, the value of which is larger than the fluctuation width, may be connected between the poles.

A workpiece is machined by the output electric power sent from the high frequency electric power unit 30. When resistor Rp is arranged between the poles, even if the load fluctuates, it is possible to stably conduct electric discharge machining, and a portion of the output of the high frequency electric power unit 30 is consumed by resistor Rp. Therefore, in the case where electric power consumed by resistor Rp can not be neglected as compared with the electric power necessary for electric discharge machining, it is impossible to control the electric discharge machining power to be constant only when an output of the DC electric power source 26 is monitored.

The voltage detection means 43 shown in FIG. 12 is arranged to take measures to solve the above problems. The voltage detection means 43 detects voltage Vr at both ends of resistor Rp (resistance value R). This voltage detection signal is inputted into the output control circuit 34, and control is conducted in the output control circuit 34 so that the equation $V \cdot I - Vr^2/R = $(constant) can be satisfied. In this case, $Vr^2/R$ is a loss caused by resistor Rp. When control is conducted as described above, an output of the high frequency electric power unit 30 can be controlled on the basis of the electric power obtained when the loss caused by resistor Rp is subtracted from the output of the high frequency electric power unit 30, that is, on the basis of the electric power inputted into electric discharge machining. Due to the foregoing, even when the loss caused by resistor Rp can not be neglected as compared with the electric power necessary for electric discharge machining, surface roughness on a machined face can be made uniform.

The above explanations are made into a case in which the loss caused resistor Rp is detected with the voltage detection means 43, however, other detection means such as a current detection means may be used.

Industrial Applicability

As described above, the electric discharge machine of the present invention is appropriately used for electric discharge machining work.

What is claimed is:

1. An electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising:

an electric power detecting means for detecting output electric power of the high frequency electric power unit, including voltage detecting means and current detecting means;

a control means for controlling output electric power of the high frequency electric power unit to be constant on the basis of a difference between a machining command signal for giving a predetermined electric power command and an electric power detection value detected by the electric power detecting means; and wherein said voltage detecting means and said current detecting means are arranged between an output of said high frequency electric power unit and said matching circuit.

2. An electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising:

an electric power detecting means for detecting output electric power of DC electric power source of the high frequency electric power unit, including voltage detecting means and current detecting means;

a control means for controlling output electric power of the DC electric power source to be constant on the basis of a difference between a machining command signal for giving a predetermined electric power command and an electric power detection value detected by the electric power detecting means; and wherein said voltage detecting means and said current detecting means are arranged between an output of said high frequency electric power unit and said matching circuit.

3. An electric discharge machine according to claim 1 or 2, the electric power detecting means including: a voltage detecting means; an electric current detecting means; and a calculating means for calculating the product of a voltage detection value detected by the voltage detecting means and a current detection value detected by the current detecting means.

4. An electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising:

a voltage detecting means for detecting output voltage V of the high frequency electric power unit;

a current detecting means for detecting output current I of the high frequency electric power unit;

a calculation means for calculating $\alpha \cdot V + \beta \cdot I$ where V is an output voltage detected by the voltage detection means, I is an output current detected by the current detection means and $\alpha$ and $\beta$ are predetermined coefficients; and a control means for controlling $\alpha \cdot V + \beta \cdot I$, which is an output of the high frequency electric power unit, to be constant on the basis of a difference between the predetermined working command signal and the calculation value of the calculation means.

5. An electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising:

a voltage detecting means for detecting output voltage V of the DC electric power source of the high frequency electric power unit;

a current detecting means for detecting output current I of the DC electric power source of the high frequency electric power unit;

a calculation means for calculating $\alpha \cdot V + \beta \cdot I$ where V is an output voltage detected by the voltage detection means, I is an output current detected by the current detection means and $\alpha$ and $\beta$ are predetermined coefficients; and a control means for controlling $\alpha \cdot V + \beta \cdot I$, which is an output of the DC electric power source, to be constant on the basis of a difference between the predetermined working command signal and the calculation value of the calculation means.

6. An electric discharge machine according to claim 4 or 5, further comprising an adjusting means for adjusting values of both coefficients $\alpha$ and $\beta$ or adjusting one of coefficients $\alpha$ and $\beta$.

7. An electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising:

an electric power detecting means for detecting output electric power of the high frequency electric power unit, including voltage detecting means and current detecting means;

a control means for controlling output electric power of the high frequency electric power unit to be constant on the basis of a difference between a machining command signal for giving a predetermined electric power command and an electric power detection value detected by the electric power detecting means;

wherein said voltage detecting means and said current detecting means are arranged between an output of said high frequency electric power unit and said matching circuit; and a resistor connected in parallel with the poles.

8. An electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising:

an electric power detecting means for detecting output electric power of the high frequency electric power unit;

a resistor connected in parallel with the poles;

a loss detection means for detecting a loss caused by the resistor arranged between the poles;

a calculation means for finding a difference between the output electric power detected by the electric power detection means and the loss detected by the loss detection means; and a control means for controlling a difference between the output electric power of the high frequency electric power unit and the loss caused by the resistor arranged between the poles on the basis of the working command signal for giving a predetermined electric power command and also on the basis of the calculation value of the calculation means.

9. An electric discharge machine in which high frequency electric power is supplied between poles of an electrode and workpiece by a high frequency electric power unit composed of a DC electric power source, oscillator and amplifier and impedance is adjusted by a matching circuit so as to generate electric discharge between the electrode and workpiece and conduct machining on the workpiece, the electric discharge machine comprising:

an electric power detecting means for detecting output electric power of the DC electric power source of the high frequency electric power unit;

a resistor connected in parallel with the poles;

a loss detection means for detecting a loss caused by the resistor arranged between the poles;

a calculation means for finding a difference between the output electric power detected by the electric power detection means and the loss detected by the loss detection means; and a control means for controlling a difference between the output electric power of the DC electric power source of the high frequency electric power unit and the loss caused by the resistor arranged between the poles to be constant on the basis of the working command signal for giving a predetermined electric power command and also on the basis of the calculation value of the calculation means.

* * * * *